United States Patent
Lavoie et al.

(10) Patent No.: US 9,610,943 B2
(45) Date of Patent: Apr. 4, 2017

(54) SYSTEM AND METHOD FOR PARALLEL PARKING A VEHICLE

(71) Applicant: Ford Global Technologies, LLC, Dearborn, MI (US)

(72) Inventors: Erick Michael Lavoie, Dearborn, MI (US); Nathaniel A. Rolfes, Oak Park, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 14/639,580

(22) Filed: Mar. 5, 2015

(65) Prior Publication Data

US 2016/0257304 A1    Sep. 8, 2016

(51) Int. Cl.
*B60W 30/06* (2006.01)
*B60W 10/20* (2006.01)
*B60W 10/04* (2006.01)

(52) U.S. Cl.
CPC ............ *B60W 30/06* (2013.01); *B60W 10/04* (2013.01); *B60W 10/20* (2013.01); *B60W 2420/10* (2013.01); *B60W 2510/20* (2013.01); *B60W 2710/20* (2013.01); *B60W 2720/10* (2013.01)

(58) Field of Classification Search
CPC .............................. B60W 30/06; B60W 10/04
See application file for complete search history.

(56) References Cited

U.S. PATENT DOCUMENTS

| 8,099,214 | B2 | 1/2012 | Moshchuk et al. |
| 8,169,341 | B2 | 5/2012 | Toledo et al. |
| 8,229,645 | B2 | 7/2012 | Lee |
| 8,521,364 | B2 | 8/2013 | Hueger et al. |
| 8,521,366 | B2 | 8/2013 | Schneider et al. |
| 8,645,015 | B2 | 2/2014 | Oetiker et al. |
| 2010/0332080 | A1* | 12/2010 | Bae ................. B62D 15/028 701/42 |
| 2014/0121930 | A1* | 5/2014 | Allexi .............. B60W 50/10 701/70 |
| 2015/0073661 | A1* | 3/2015 | Raisch ............ B62D 15/027 701/41 |

(Continued)

FOREIGN PATENT DOCUMENTS

| CN | 102874252 A | 1/2013 |
| JP | 2014024462 | * 6/2014 |

*Primary Examiner* — Thomas G Black
*Assistant Examiner* — Peter D Nolan
(74) *Attorney, Agent, or Firm* — Frank MacKenzie; Price Heneveld LLP (57) ABSTRACT

A system for parallel parking a vehicle in a target parking space is provided herein. A sensing system is configured to detect objects located proximate the target parking space. A park assist system is communicatively coupled to the sensing system. The park assist system is configured to automatically steer the vehicle during a backing maneuver into the target parking space while limiting the speed of the vehicle based on a steering wheel angle. The sensing system is also configured to automatically steer the vehicle during maneuvers inside the target parking space while limiting the speed of the vehicle based on a relative position of at least one of a rear bounding object and a front bounding object.

16 Claims, 8 Drawing Sheets

(56) References Cited

U.S. PATENT DOCUMENTS

| | | | |
|---|---|---|---|
| 2015/0187217 A1* | 7/2015 | Yao | B60T 7/22 |
| | | | 701/301 |
| 2016/0001774 A1* | 1/2016 | Nakada | B60W 10/04 |
| | | | 701/22 |

* cited by examiner

SYSTEM AND METHOD FOR PARALLEL PARKING A VEHICLE

FIELD OF THE INVENTION

The present invention generally relates to vehicle park assist systems and, in particular, to an improved park assist system and method for parallel parking a vehicle.

BACKGROUND OF THE INVENTION

Parallel parking a vehicle can be difficult for many drivers. Thus, there is a need for a park assist system that can execute a parallel parking maneuver into a target parking space with minimal driver action required.

SUMMARY OF THE INVENTION

According to one aspect of the present invention, a system for parallel parking a vehicle in a target parking space is provided. A sensing system is configured to detect objects located proximate the target parking space. A park assist system is communicatively coupled to the sensing system. The park assist system is configured to automatically steer the vehicle during a backing maneuver into the target parking space while limiting the speed of the vehicle based on a steering wheel angle. The sensing system is also configured to automatically steer the vehicle during maneuvers inside the target parking space while limiting the speed of the vehicle based on a relative position of at least one of a rear bounding object and a front bounding object.

According to another aspect of the present invention, a method for parallel parking a vehicle in a target parking space is provided. The method includes the steps of: (a) detecting objects located proximate the target parking space; (b) automatically steering the vehicle during a backing maneuver into the target parking space while limiting the speed of the vehicle based on a steering wheel angle; and (c) automatically steering the vehicle during maneuvers inside the target parking space while limiting the speed of the vehicle based on a relative position of at least one of a rear bounding object and a front bounding object.

According to yet another aspect of the present invention, a method for parallel parking a vehicle in a target parking space is provided. The method includes the steps of: (a) detecting objects located proximate a target parking space; (b) automatically steering the vehicle during a backing maneuver into the target parking space while limiting the speed of the vehicle to a first speed when a steering wheel angle is less than a threshold steering wheel angle; (c) automatically steering the vehicle during the backing maneuver and limiting the speed of the vehicle to a second speed when the steering angle is equal to or greater than the threshold steering wheel angle; (d) automatically steering the vehicle while the vehicle is being backed inside the target parking space and limiting the speed of the vehicle to a third speed if a rear bounding object is detected more than a first distance away from the vehicle; (e) automatically steering the vehicle while the vehicle is being backed inside the target parking space and limiting the speed of the vehicle to a fourth speed if the rear bounding object is at or within the first distance from the vehicle; (f) automatically steering the vehicle while the vehicle is moved forward inside the target parking space and limiting the speed of the vehicle to a fifth speed if a front bounding object is detected more than a second distance away from the vehicle; and (g) automatically steering the vehicle while the vehicle is moved forward inside the target parking space and limiting the speed of the vehicle to a sixth speed if the front bounding object is detected at or within the second distance from the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
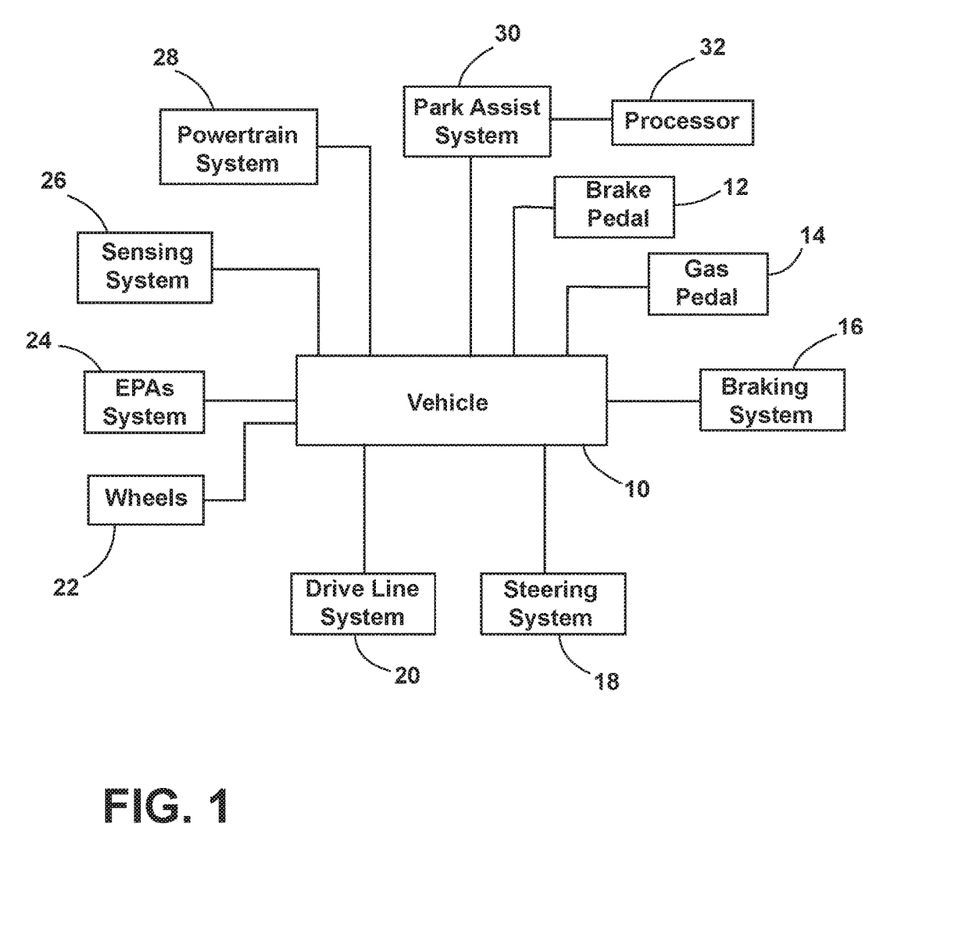
FIG. 1 is a schematic diagram of a vehicle equipped with a park assist system and other related components and equipment.

Referring to FIG. 1, a schematic diagram of a vehicle 10 is shown according to one embodiment. The vehicle 10 includes at least the following equipment or systems: a brake pedal 12, a gas pedal 14, a braking system 16, a steering system 18, a driveline system 20, wheels 22, an electric power assisted steering (EPAS) system 24, which may be part of the steering system 18, a sensing system 26, a powertrain system 28, and a park assist system 30 having a processor 32. Alternatively, an electro-assisted power steering system (not shown) may be used instead of the EPAS system 24. Additionally, the vehicle 10 described herein may include other suitable equipment or systems in lieu of those described above.

Figure 2:
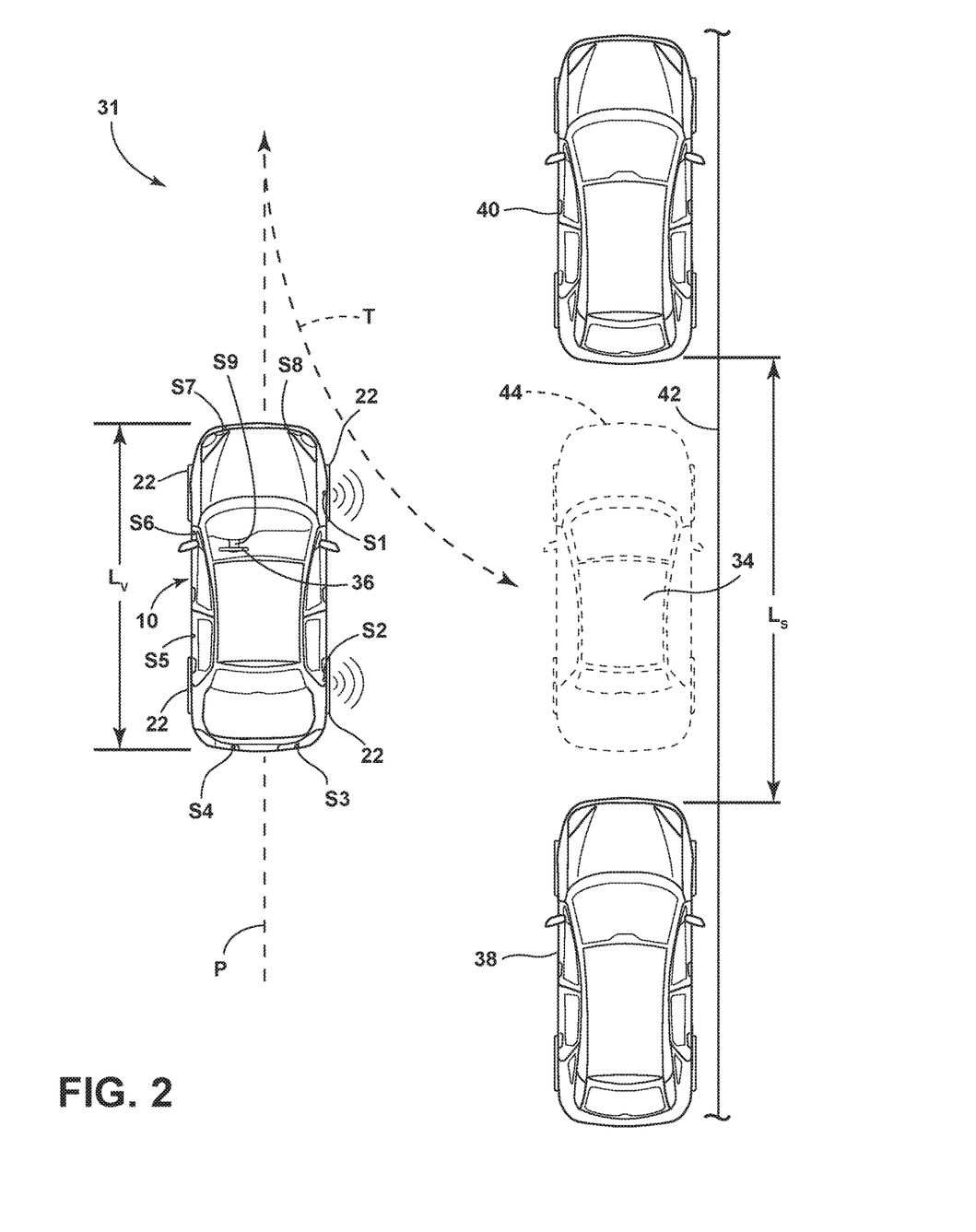
FIG. 2 illustrates a steering trajectory for backing a vehicle equipped with a park assist system into a target parking space.

Referring to FIG. 2, a schematic diagram of a system 31 for parallel parking the vehicle 10 into a target parking space 34 is shown according to one embodiment. In the illustrated embodiment, the sensing system 26 includes ultrasonic sensors S1-S8 disposed variously on the front, sides, and rear of the vehicle 10. However, it should be appreciated that the number and/or location of the ultrasonic sensors S1-S8 may be other than illustrated, if so desired. The sensing system 26 also includes a steering wheel sensor S9, which may be located on a steering wheel 36 of the vehicle 10. Additionally or alternatively, the sensing system 26 may include radar, lidar, cameras, lasers, thermal sensors, GPS sensors, odometric sensors, or a combination thereof.

In operation, the ultrasonic sensors S1-S8 are configured to detect neighboring objects and their location relative to the position of the vehicle 10 while the vehicle 10 is driven past the objects. In the illustrated embodiment, the vehicle 10 is driven along path P and the objects correspond to a rear bounding object, shown as parked vehicle 38, a front bounding object, shown as parked vehicle 40, and a side bounding object, shown as curb 42, all of which may be detected by ultrasonic sensors S1 and S2 while the vehicle 10 drives past them at a slow speed. The processor 32 of the park assist system 30 processes information received from ultrasonic sensors S1 and S2 to determine a slot length $L_s$ of the target parking space 34 and then determines whether the slot length $L_s$ is sufficient based on the known length $L_v$ of the vehicle 10.

In practice, a slot length $L_s$ may be sufficient if it is large enough to allow the vehicle 10 to be parallel parked inside the target parking space 34 without coming into contact with objects detected by ultrasonic sensors S1-S8 of the vehicle 10. Upon determining that the slot length $L_s$ is sufficient, the processor 32 computes a steering trajectory T for parking the vehicle 10 into the target parking space 34 based on information received from one or more components of the sensing system 26 and the position of the vehicle 10 relative to neighboring objects. The driver of the vehicle 10 may then be notified that a parallel parking maneuver can be successfully performed into the target parking space 34 and is instructed to stop the vehicle 10 to commence the parallel parking maneuver. Notifications to the driver may include visual notifications such as text messages appearing on a display inside the vehicle 10, auditory notifications, haptic notifications, and/or other sensory notifications.

Depending on the slot length $L_s$ of the target parking space 34, the parallel parking maneuver may be variously performed as a series of maneuvers. Such maneuvers generally include backing the vehicle 10 along the steering trajectory T, stopping the vehicle 10 briefly inside the target parking space 34, and moving the vehicle 10 backward and/or forward inside the target parking space 34 before stopping the vehicle 10 in a final park position 44. As will be described in greater detail below, each maneuver may be performed semi-autonomously with the assistance of the driver. However, it should be appreciated that the maneuvers may also be performed autonomously in vehicles equipped with such functionality. Thus, it is to be understood that the methods and depictions described below are provided in regard to one possible vehicle configuration and should not be seen as limiting.

Figure 3:
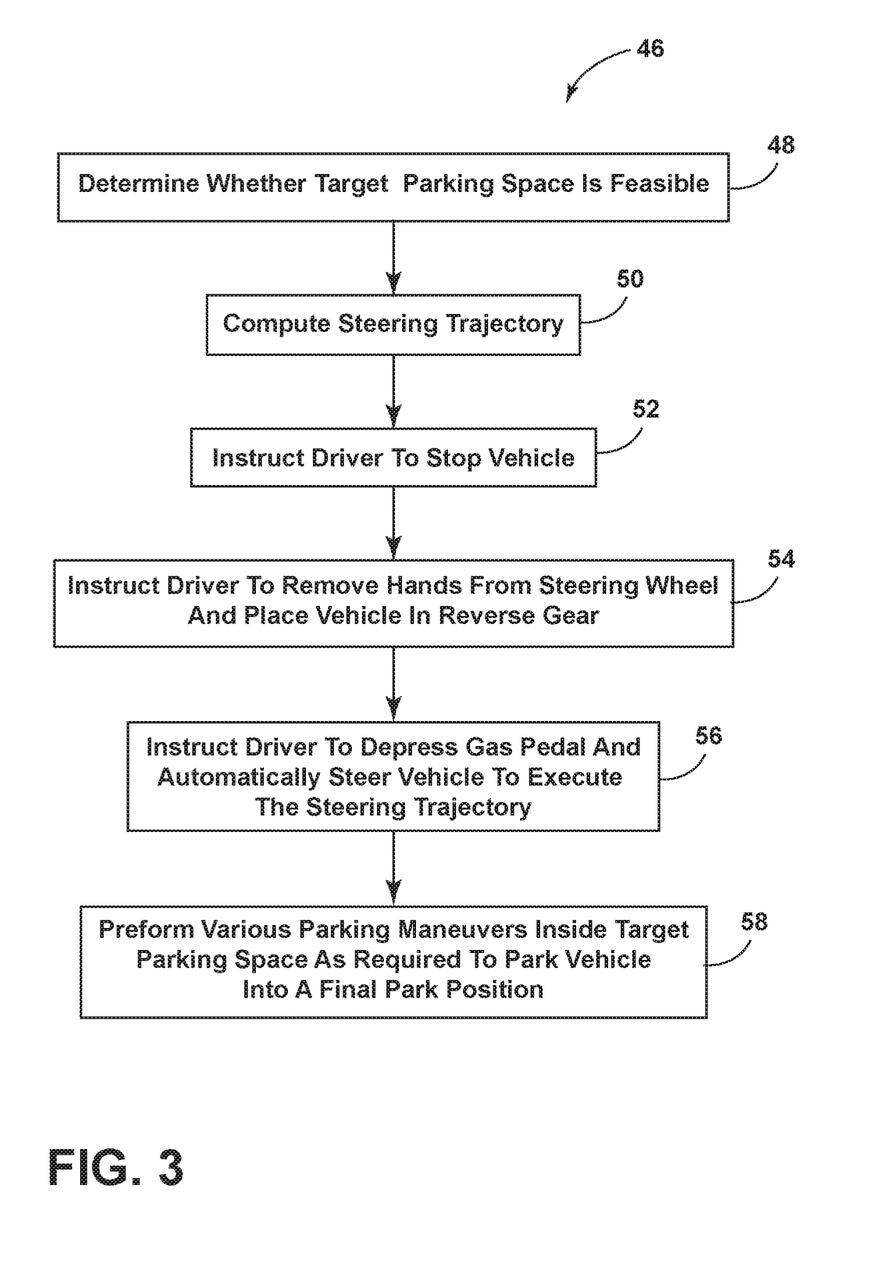
FIG. 3 is flow chart of a method for parallel parking a vehicle into a target parking space.

Referring to FIG. 3, there is illustrated a flow chart of an embodiment of a method 46 for parallel parking the vehicle 10 into a target parking space 34 using the sensing system 26 and the park assist system 30 described herein. As described in greater detail below, the method 46 of parallel parking the vehicle 10 can be broken into a series of maneuvers executed using the park assist system 30 in conjunction with one or more driver actions. In each maneuver, the park assist system 30 takes over the steering of the vehicle 10 and controls the speed at which the vehicle 10 travels to help ensure that the vehicle 10 is successfully parked into the target parking space 34. To gain a better understanding, a variety of maneuvers are shown in FIGS. 4-7 and will be referenced to accordingly while describing the method 46. In FIGS. 4-7, the target parking space 34 is described as being on the right side of the vehicle 10. However, it should be appreciated that the sensing system 26 and the park assist system 30 may be employed in a similar manner when desiring to parallel park into a target parking space located on the left side of the vehicle 10.

Figure 4:
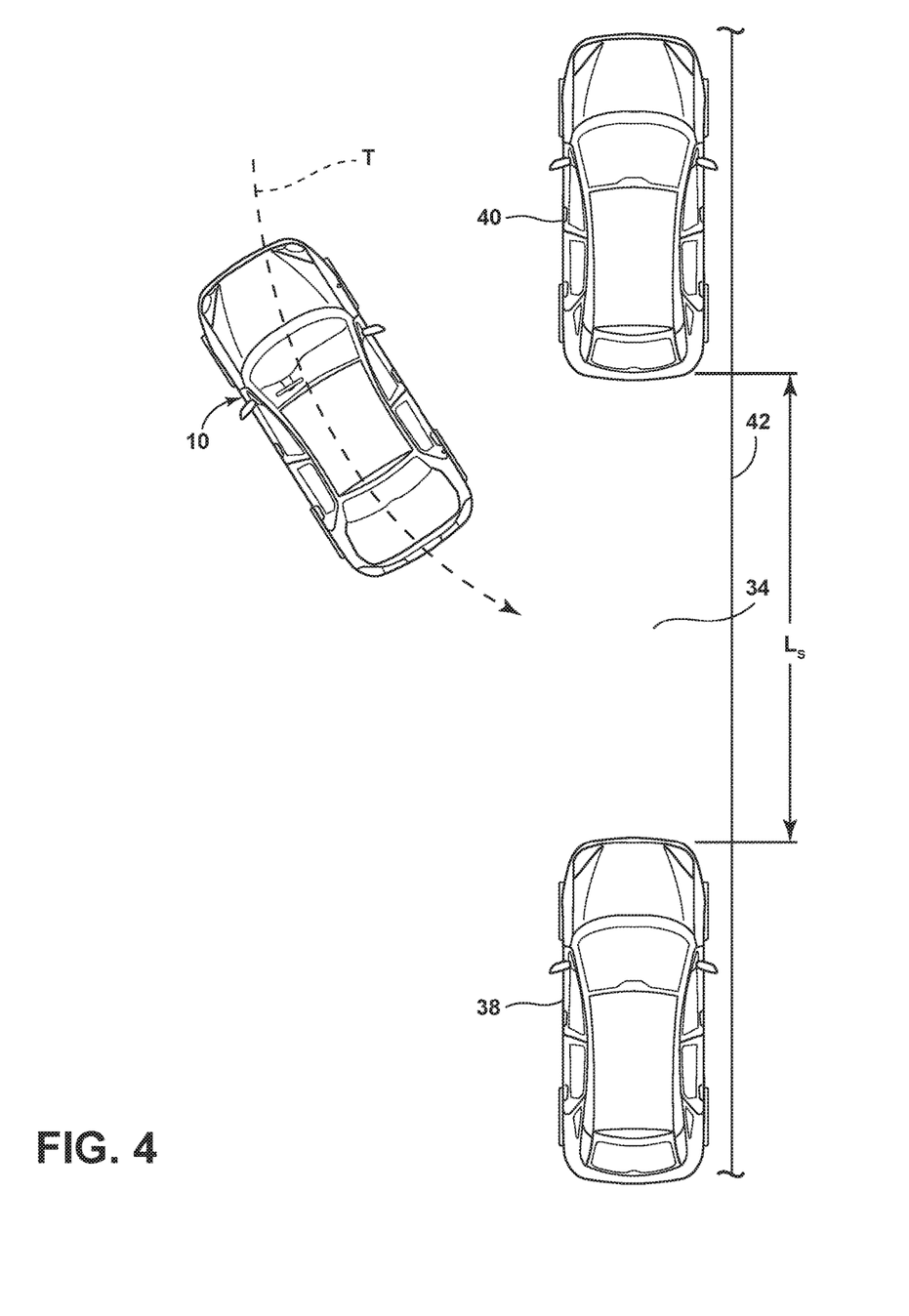
FIG. 4 illustrates a backing maneuver along a steering trajectory into a target parking space.

The method 46 includes step 48, in which the park assist system 30 determines whether the target parking space 34 is feasible, or said differently, whether a sufficient slot length $L_s$ is available for parking the vehicle 10 into the target parking space 34. If it is determined that the target parking space 34 is feasible, the processor 32 computes a steering trajectory T into the target parking space 34 at step 50 and the driver of the vehicle 10 is instructed to stop at step 52. Once the vehicle 10 is stopped, the driver is instructed to remove his or her hands from the steering wheel 36 and engage or shift the transmission of the powertrain system 28 into reverse gear at step 54. Next, at step 56, the driver is instructed to depress the gas pedal 14 and the park assist system 30 automatically steers the vehicle 10 to execute the steering trajectory T (FIG. 4).

According to one embodiment, the vehicle 10 may be backed along the steering trajectory T into the target parking space 34 at a controlled speed based on a steering wheel angle measured by the steering wheel sensor S9 and provided to the processor 32 of the park assist system 30. For example, the park assist system 30 may limit the speed of the vehicle 10 a first speed when the steering wheel angle is less than a threshold steering wheel angle (e.g., 10 degrees) and a second speed when the steering wheel angle is equal to or greater than the threshold steering wheel angle. The second speed may be less than the first speed so that the vehicle 10 travels at a slower pace along portions of the steering trajectory T that have greater curvature.

At the completion of step 56, the vehicle 10 will be inside the target parking space 34 and the park assist system 30 will provide instructions to the driver to perform various parking maneuvers inside the target parking space 34 as required to park the vehicle 10 in a final park position at step 58. Such maneuvers may include driving the vehicle 10 backward, driving the vehicle 10 forward, or a combination thereof. The final park position may correspond to a parked position in which the vehicle 10 is parallel with and located at similar distances from the rear and front bounding objects while spaced at a predetermined distance from any side bounding object. While the vehicle 10 is performing each maneuver, the park assist system 30 automatically steers the vehicle 10 at a controlled speed determined based on a relative position of the rear bounding object and/or the front bounding object while avoiding collision from any side bounding objects. For purposes of illustration, a backward parking maneuver and a forward parking maneuver are described below for parking the vehicle 10 into a target parking space 34 having a relatively large slot length $L_s$.

Figure 5:
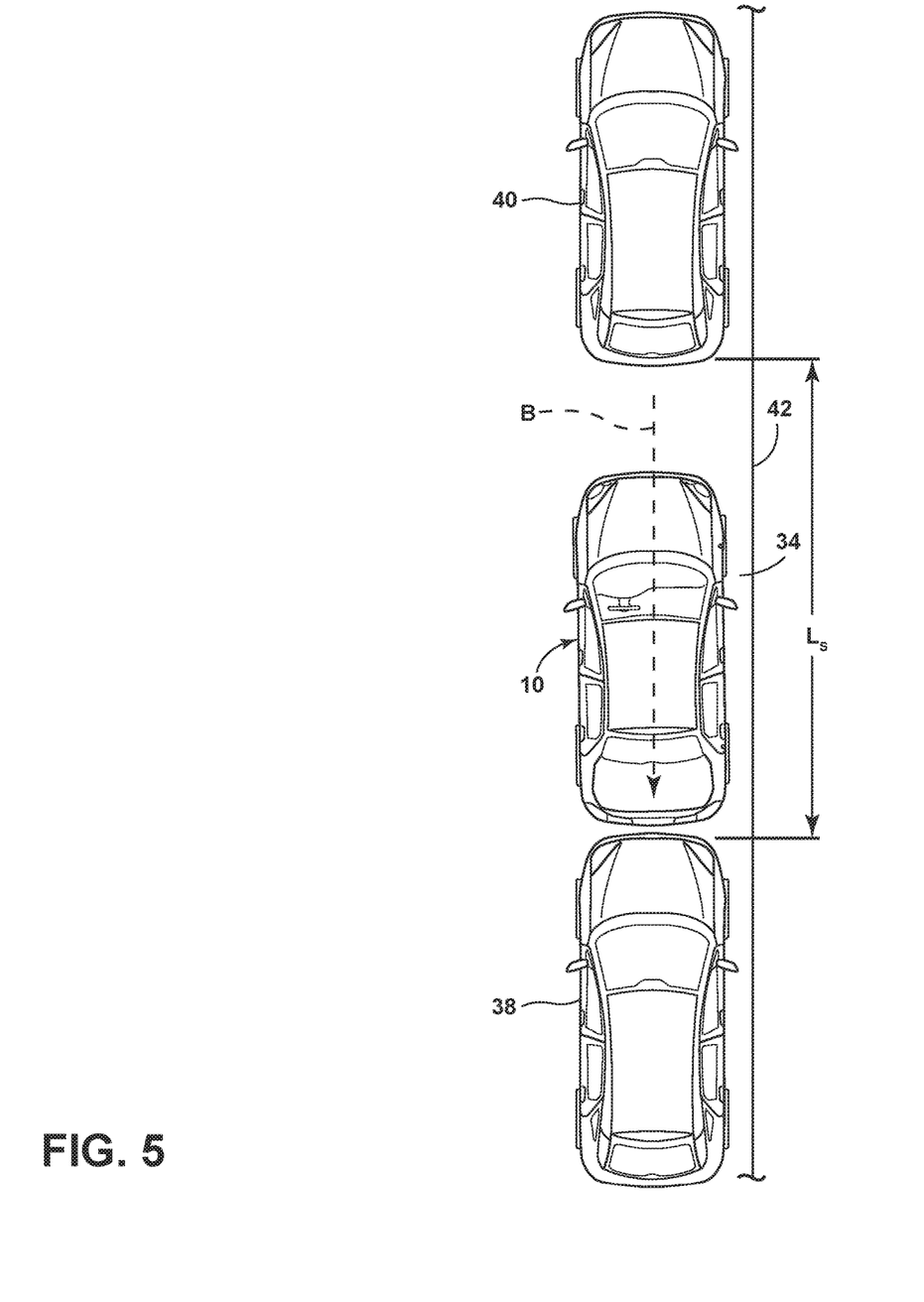
FIG. 5 illustrates a backing maneuver along a backward trajectory inside a target parking space.

As shown in FIG. 5, the driver may continue to back the vehicle 10 inside the target parking space 34 along backward path B while the park assist system 30 continues to automatically steer the vehicle 10. While the vehicle 10 is being backed inside the target parking space 34, the park assist system 30 may limit the speed of the vehicle 10 to a third speed, which may be slower than the first and second speed, so long as the rear bounding object (e.g., parked vehicle 38) is undetected or detected more than a first distance (e.g., 1 meter) away from the vehicle 10. If the rear bounding object is detected at or within the first distance from the vehicle 10, the park assist system 30 may limit the speed of the vehicle 10 to a fourth speed, which is slower than the third speed to ensure adequate time for the vehicle 10 to be stopped before colliding with the rear bounding object. In the present embodiment, the driver may be instructed to stop the vehicle 10 when the rear bounding object is detected at some predetermined distance smaller than the first distance.

Figure 6:
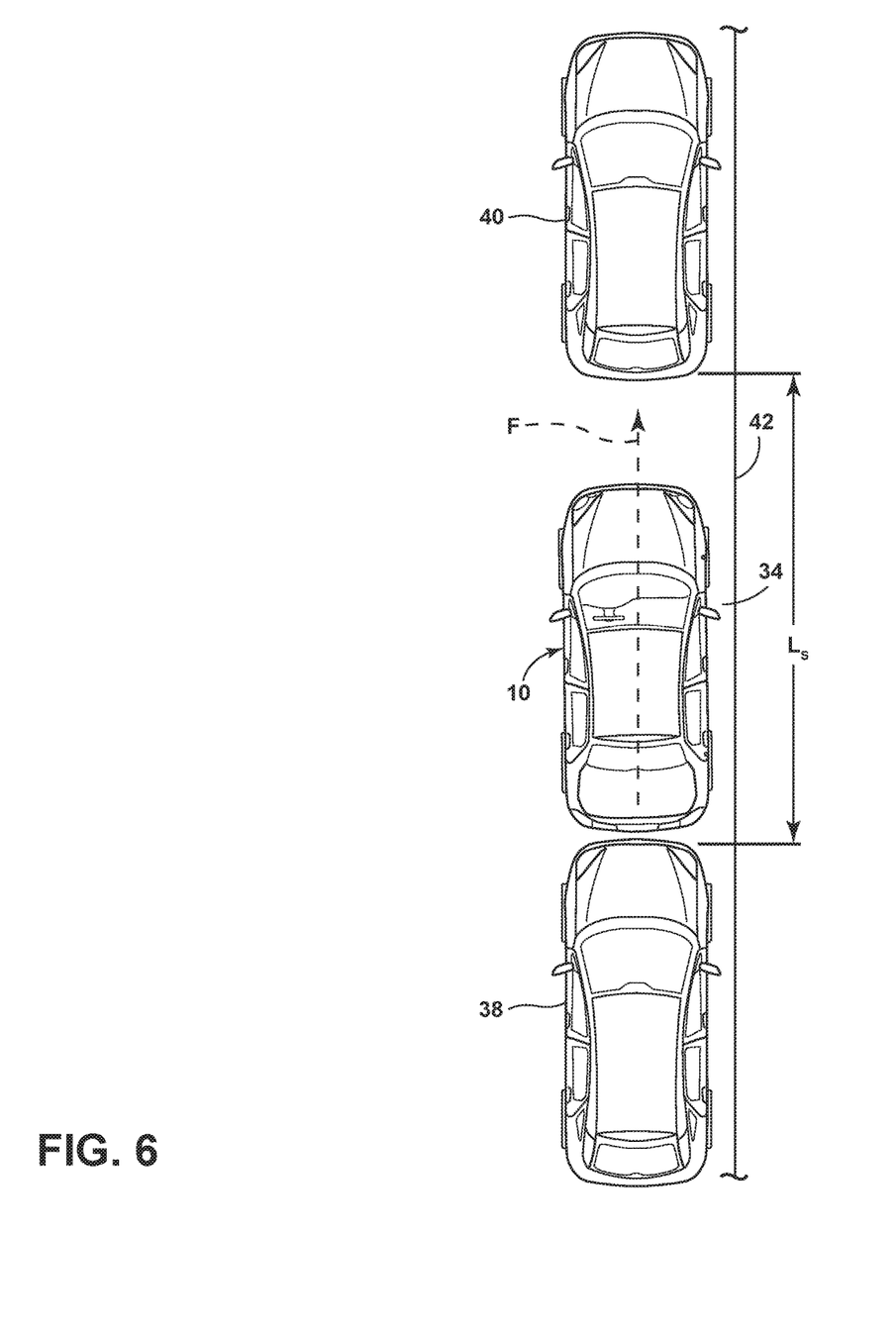
FIG. 6 illustrates a forward maneuver along a forward trajectory inside a target parking space.
Figure 7:
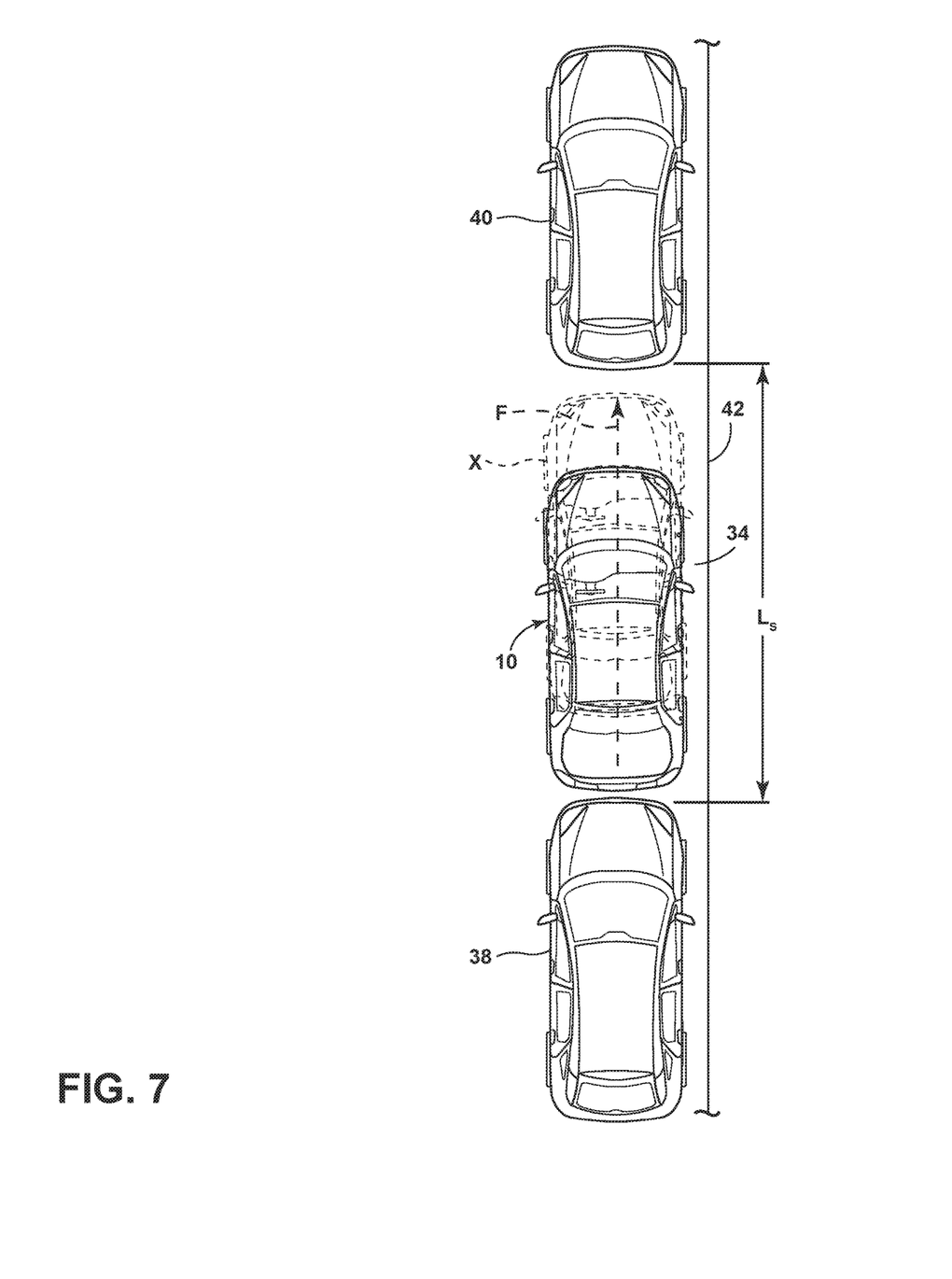
FIG. 7 illustrates a final park position of a vehicle inside a target parking space.

Once the vehicle 10 is stopped, the driver is instructed to shift the transmission of the powertrain system 28 into drive gear and depress the gas pedal 14, thereby moving the vehicle 10 forward along forward path F while the park assist system 30 continues to automatically steer the vehicle 10, as shown in FIG. 6. While the vehicle 10 is moved forward inside the target parking space 34, the park assist system 30 may limit the speed of the vehicle 10 to a fifth speed, which may be similar to the third speed, so long as the front bounding object (e.g., parked vehicle 40) is undetected or detected more than a second distance (e.g., 1 meter) away from the vehicle 10. If the front bounding object is detected at or within the first distance from the vehicle 10, the park assist system 30 may limit the speed of the vehicle 10 to a sixth speed, which is slower than the fifth speed and may be similar to the fourth speed to ensure adequate time for the vehicle 10 to be stopped before colliding with the front bounding object. In the present embodiment, the driver may be instructed to stop the vehicle 10 when the front bounding object is detected at some predetermined distance smaller than the second distance or when the vehicle 10 has reached a final park position X, as shown in FIG. 7.

Figure 8:
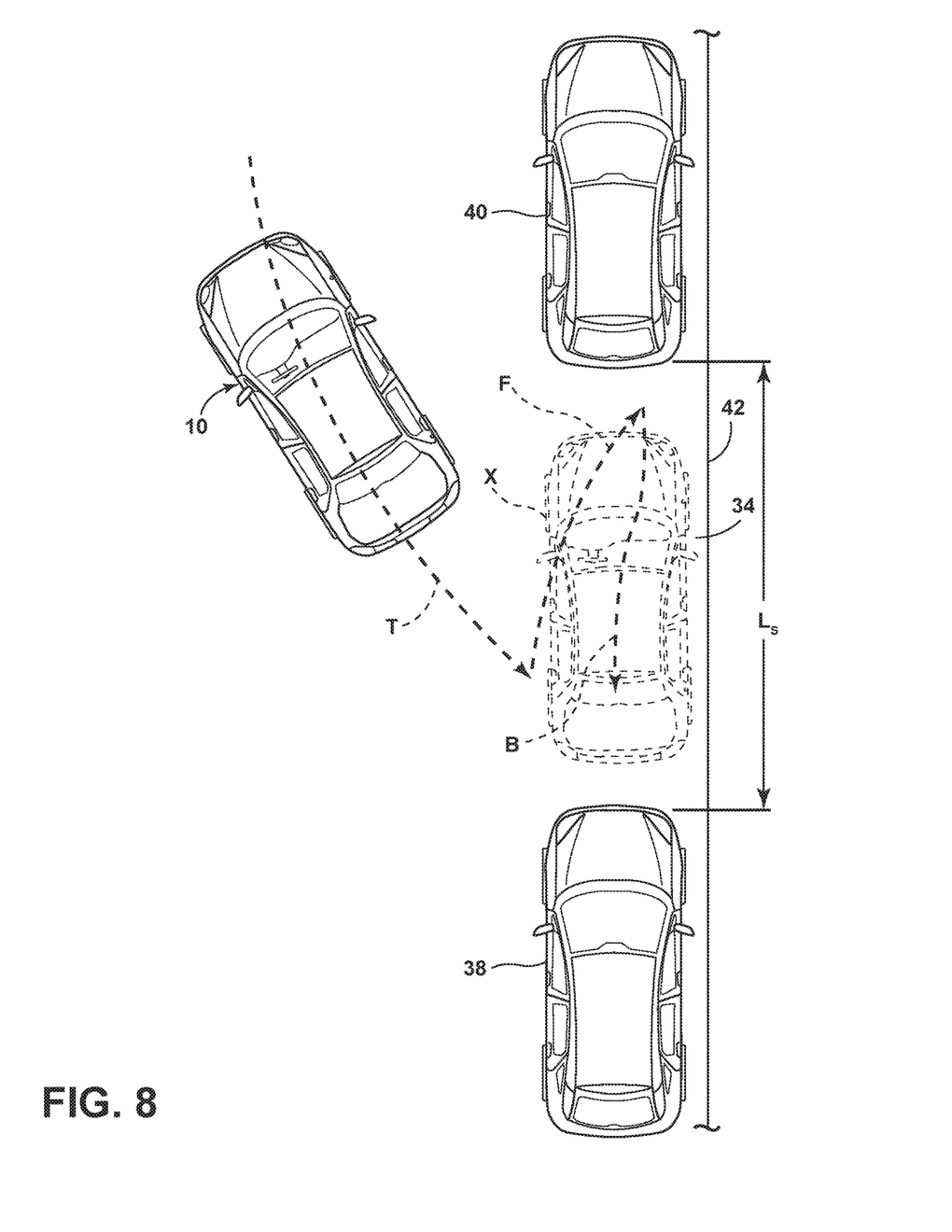
FIG. 8 illustrates several maneuvers for parallel parking a vehicle inside a tight target parking space.

Although parking maneuvers have been described above for parallel parking a vehicle 10 into a target parking space 34 having a relatively large slot length $L_s$, it should be appreciated that a different order of parking maneuvers may be required in other instances. For example, if the target parking space 34 has a relatively small slot length $L_s$, it may be required to move the vehicle 10 forward upon entering the target parking space 34, followed by a backward movement before the vehicle 10 is able to reach the final park position. For example, FIG. 8 illustrates a parallel parking maneuver in which the vehicle is first backed along steering trajectory T, followed by a forward maneuver along forward trajectory F and then a backward maneuver along backward trajectory B before the vehicle 10 comes to rest at the final park position X.

Accordingly, a system and method for parallel parking a vehicle into a target space have been described herein through the employ of multiple auto-steer maneuvers at speed controlled stages to ensure that the vehicle is successfully parked in a final park position. As a result, the process of parallel parking is greatly simplified.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for parallel parking a vehicle in a target parking space, comprising:
   a sensing system configured to detect objects located proximate the target parking space; and
   a park assist system communicatively coupled to the sensing system and configured to:
      automatically steer the vehicle during a backing maneuver into the target parking space while limiting the speed of the vehicle based on a steering wheel angle; and
      automatically steer the vehicle during maneuvers inside the target parking space while limiting the speed of the vehicle based on a relative position of at least one of a rear bounding object and a front bounding object;
   wherein the park assist system is configured to limit the speed of the vehicle to a first speed when the steering wheel angle is less than a threshold steering wheel angle and a second speed when the steering angle is equal to or greater than the threshold steering wheel angle; and
   wherein the park assist system is configured to limit the speed of the vehicle to a third speed when the rear bounding object is detected more than a first distance away from the vehicle and a fourth speed when the rear bounding object is detected at or within the first distance from the vehicle.

2. The system of claim 1, wherein the sensing system comprises a plurality of ultrasonic sensors and a steering wheel sensor.

3. The system of claim 1, wherein the second speed is slower than the first speed.

4. The system of claim 1, wherein the fourth speed is slower than the third speed.

5. The system of claim 1, wherein the park assist system is configured to limit the speed of the vehicle to a fifth speed when the front bounding object is detected more than a second distance away from the vehicle and a sixth speed when the front bounding object is detected at or within the second distance from the vehicle.

6. The system of claim 5, wherein the sixth speed is slower than the fifth speed.

7. A method for parallel parking a vehicle in a target parking space, comprising the steps of:
   (a) detecting objects located proximate the target parking space;
   (b) automatically steering the vehicle during a backing maneuver into the target parking space while limiting the speed of the vehicle based on a steering wheel angle; and
   (c) automatically steering the vehicle during maneuvers inside the target parking space while limiting the speed of the vehicle based on a relative position of at least one of a rear bounding object and a front bounding object;
   wherein step (b) comprises the step of limiting the speed of the vehicle to a first speed when the steering wheel angle is less than a threshold steering wheel angle and a second speed when the steering angle is equal to or greater than the threshold steering wheel angle; and
   wherein step (c) comprises the step of: limiting the speed of the vehicle to a third speed while the vehicle is being backed inside the target parking space and the rear bounding object is detected more than a first distance away from the vehicle; and limiting the speed of the vehicle to a fourth speed while the vehicle is being backed inside the target parking space and the rear bounding object is detected at or within the first distance from the vehicle.

8. The method of claim 7, wherein the second speed is slower than the first speed.

9. The method of claim 7, wherein the fourth speed is slower than the third speed.

10. The method of claim 7, wherein step (c) further comprises the step of: limiting the speed of the vehicle to a fifth speed while the vehicle is moved forward inside the target parking space and the front bounding object is detected more than a second distance away from the vehicle; and limiting the speed of the vehicle to a sixth speed while the vehicle is moved forward inside the target space and the front bounding object is detected at or within the second distance from the vehicle.

11. The method of claim 10, wherein the sixth speed is slower than the fifth speed.

12. A method for parallel parking a vehicle in a target parking space, comprising the steps of:
   (a) detecting objects located proximate a target parking space;
   (b) automatically steering the vehicle during a backing maneuver into the target parking space while limiting the speed of the vehicle to a first speed when a steering wheel angle is less than a threshold steering wheel angle;

(c) automatically steering the vehicle during the backing maneuver and limiting the speed of the vehicle to a second speed when the steering angle is equal to or greater than the threshold steering wheel angle;

(d) automatically steering the vehicle while the vehicle is being backed inside the target parking space and limiting the speed of the vehicle to a third speed if a rear bounding object is detected more than a first distance away from the vehicle;

(e) automatically steering the vehicle while the vehicle is being backed inside the target parking space and limiting the speed of the vehicle to a fourth speed if the rear bounding object is at or within the first distance from the vehicle;

(f) automatically steering the vehicle while the vehicle is moved forward inside the target parking space and limiting the speed of the vehicle to a fifth speed if a front bounding object is detected more than a second distance away from the vehicle; and (g) automatically steering the vehicle while the vehicle is moved forward inside the target parking space and limiting the speed of the vehicle to a sixth speed if the front bounding object is detected at or within the second distance from the vehicle.

13. The method of claim 12, wherein step (c) follows step (b).

14. The method of claim 12, wherein at least one of steps (f) and (g) follow at least one of steps (d) and (e).

15. The method of claim 12, wherein at least one of steps (d) and (e) follow at least one of steps (f) and (g).

16. The method of claim 12, wherein the second speed is slower than the first speed, the fourth speed is slower than the third speed; and the sixth speed is slower than the fifth speed.

* * * * *